United States Patent
Larose et al.

(10) Patent No.: US 10,690,200 B2
(45) Date of Patent: Jun. 23, 2020

(54) MANUALLY-ACTUATED BRAKE SYSTEM USING MAGNETORHEOLOGICAL FLUID CLUTCH APPARATUS

(71) Applicant: EXONETIK INC., Sherbrooke (CA)

(72) Inventors: Pascal Larose, Sherbrooke (CA); Marc Denninger, Sherbrooke (CA); Guifre Julio, Sherbrooke (CA); Jean-Sebastien Plante, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 31 days.

(21) Appl. No.: 15/748,304

(22) PCT Filed: Jul. 28, 2016

(86) PCT No.: PCT/CA2016/050890
§ 371 (c)(1),
(2) Date: Jan. 29, 2018

(87) PCT Pub. No.: WO2017/015763
PCT Pub. Date: Feb. 2, 2017

(65) Prior Publication Data
US 2018/0216682 A1    Aug. 2, 2018

Related U.S. Application Data (60) Provisional application No. 62/198,315, filed on Jul. 29, 2015.

(51) Int. Cl.
*F16D 57/00* (2006.01)
*F16D 67/04* (2006.01)
(Continued)

(52) U.S. Cl.
CPC ......... *F16D 57/002* (2013.01); *F16D 67/04* (2013.01); *F16D 2066/005* (2013.01); *F16D 2066/008* (2013.01); *F16H 19/043* (2013.01)

(58) Field of Classification Search
CPC .. F16D 57/002; F16D 67/04; F16D 2066/005; F16D 2066/008; B60T 10/02; B60T 13/662; B60T 8/3225; B62L 3/023
(Continued)

(56) References Cited

U.S. PATENT DOCUMENTS

| | | | | |
|---|---|---|---|---|
| 4,717,211 A | * | 1/1988 | Dittner | B60T 8/3225 303/115.2 |
| 4,805,740 A | * | 2/1989 | Wilke | B60T 13/741 188/173 |

(56) References Cited

| | | | | |
|---|---|---|---|---|
| 2003/0201667 A1 | * | 10/2003 | Juan | B60T 11/101 303/9.64 |
| 2008/0183353 A1 | | 7/2008 | Post et al. | |

(Continued)

FOREIGN PATENT DOCUMENTS

| | | |
|---|---|---|
| CN | 1482376 A | 3/2004 |
| CN | 102401046 A | 4/2012 |
| CN | 202225863 U | 5/2012 |
| DE | 102011076424 A1 | 11/2012 |

(Continued)

OTHER PUBLICATIONS

English machined translation of DE-102013221084.*

*Primary Examiner* — Robert A. Siconolfi
*Assistant Examiner* — San M Aung
(74) *Attorney, Agent, or Firm* — Norton Rose Fulbright Canada LLP (57) ABSTRACT

A braking control apparatus comprises at least one torque source. At least one magnetorheological (MR) fluid clutch apparatus having an input coupled to the at least one torque source to receive torque from the torque source, the MR fluid clutch apparatus controllable to transmit a variable amount of torque via an output thereof. A modulation interface couples the output of the at least one MR fluid
(Continued)

clutch apparatus to a braking power transmission of a brake system. At least one sensor provides information indicative of a braking state of the load. A processing unit receives the information indicative of the braking state of the load and for outputting a signal to control the at least one MR fluid clutch apparatus in exerting a desired force on the braking power transmission to assist in braking the load. A method for assisting a manually-actuated braking of a vehicle is also provided.

48 Claims, 10 Drawing Sheets

(51) Int. Cl.
    *F16D 66/00*     (2006.01)
    *F16H 19/04*     (2006.01)
(58) Field of Classification Search
    USPC ........................................................ 303/127
    See application file for complete search history.

(56) References Cited

U.S. PATENT DOCUMENTS

| | | |
|---|---|---|
| 2011/0254358 A1 | 10/2011 | Strengert et al. |
| 2013/0200687 A1* | 8/2013 | Guo ...................... B60T 8/4068 303/87 |
| 2014/0110217 A1* | 4/2014 | Cichon, Jr. ............. F16F 9/535 192/99 R |
| 2016/0121869 A1 | 5/2016 | Cann |

FOREIGN PATENT DOCUMENTS

| | | | |
|---|---|---|---|
| DE | 102012222058 | * | 6/2014 |
| DE | 102013221084 A1 | | 4/2015 |
| EP | 1482200 A1 | | 12/2004 |
| EP | 2749483 A1 | | 7/2014 |
| WO | 2009091767 A1 | | 7/2009 |
| WO | 2016066122 A1 | | 5/2016 |

\* cited by examiner

MANUALLY-ACTUATED BRAKE SYSTEM USING MAGNETORHEOLOGICAL FLUID CLUTCH APPARATUS

CROSS-REFERENCE TO RELATED APPLICATION

The present application claims priority of U.S. Provisional Patent Application Ser. No. 62/198,315, filed on Jul. 29, 2015, the contents of which are incorporated herein by reference.

TECHNICAL FIELD

The present application relates generally to manually-actuated systems controlling the speed and the force of a moving load, and more particularly to such to manually-actuated brake systems using magnetorheological (MR) fluid clutch apparatuses.

BACKGROUND OF THE ART

In controlled linkage, cable or hydraulic brake systems, the force or pressure source is well known and can be designed to be lightweight by using, for example, a human activated lever, a piston, pneumatic or hydraulic pump. In some state-of-the-art manually operated systems where standard actuators, like hydraulic actuator or valves, are used to modulate the output force, the performance of the system may be limited by the bandwidth of the actuator or valve. One example out of many is in a motorcycle ABS system where the human provides the primary braking force and where a hydraulic system is only used to regulate the force applied at the brake friction points as a function of wheel speed versus body speed. In this example, the wheels often show large speed variation or even completely block due to the fact that the hydraulic actuator does not have enough mechanical bandwidth response to adapt rapidly to the changing conditions or to make fine enough adjustments of braking force. In another example of manually-operated equipment, low bandwidth of standard actuators translates in poor dynamics that can affect the sense of touch, in particular when rigid interfaces or actuators are used.

SUMMARY

It is an aim of the present disclosure to provide a novel manually-actuated system that employs MR fluid modulation.

It is a further aim of the present disclosure that the manually-actuated system employs MR fluid modulation for braking a moving load.

It is a further aim of the present disclosure that the manually-actuated system employs MR fluid modulation for controlling a traction of a moving load.

Therefore, in accordance with a first embodiment of the present disclosure, there is provided a braking control apparatus comprising: at least one torque source; at least one magnetorheological (MR) fluid clutch apparatus having an input coupled to the at least one torque source to receive torque from the torque source, the MR fluid clutch apparatus controllable to transmit a variable amount of torque via an output thereof; a modulation interface coupling the output of the at least one MR fluid clutch apparatus to a braking power transmission of a brake system; at least one sensor for providing information indicative of a braking state of the load; and a processing unit for receiving the information indicative of the braking state of the load and for outputting a signal to control the at least one MR fluid clutch apparatus in exerting a desired force on the braking power transmission to assist in braking the load.

Further in accordance with the first embodiment, the braking power transmission is a hydraulic conduit network, and wherein the modulation interface has at least one cylinder with a piston coupled to the output of the at least one MR fluid clutch apparatus.

Still further in accordance with the first embodiment, the output has a gear meshed to a rack connected to the piston to convert a rotation of the output to a translation of the piston.

Still further in accordance with the first embodiment, the rack is mounted to a carriage in the modulation interface.

Still further in accordance with the first embodiment, a bleed valve is associated to the cylinder, the bleed valve being biased to a bypass position in which the bleed valve defines a fluid passage for fluid in the braking power transmission to flow therethrough and transmit braking power, and a retracted position in which the bleed valve blocks said fluid passage for fluid in the braking power transmission to transmit braking power via the piston in the cylinder.

Still further in accordance with the first embodiment, a plurality of the cylinder are provided, with each said cylinder connected to a respective one of the MR fluid clutch apparatus, each said cylinder configured to be coupled to a respective output hydraulic conduit of a respective brake device.

Still further in accordance with the first embodiment, the plurality of the cylinders are connected to a single common input hydraulic conduit for receiving a common input braking force.

Still further in accordance with the first embodiment, the plurality of the cylinders are each connected to respective input hydraulic conduit for receiving a respective input braking force.

Still further in accordance with the first embodiment, the braking power transmission is a cable transmission.

Still further in accordance with the first embodiment, the output has a gear meshed to a rack, the rack being connected to ends of cables of the cable transmission.

Still further in accordance with the first embodiment, the output has a capstan, a cable of the cable transmission being wound onto the capstan.

Still further in accordance with the first embodiment, the output has a pulley being connected to ends of cables of the cable transmission.

Still further in accordance with the first embodiment, comprising a plurality of the MR fluid clutch apparatus each associated with a respective brake device, and further comprising a single one of the torque source, the input of each of the plurality of the MR fluid clutch apparatuses commonly connected to the single one of the torque sources.

Still further in accordance with the first embodiment, the at least one MR fluid clutch apparatus is coupled to the braking power transmission by the modulation interface such that the at least one MR fluid clutch apparatus transmits torque to reduce a braking power transmitted to brake devices of the brake system.

Still further in accordance with the first embodiment, the processing unit maintains the at least one MR fluid clutch apparatus in a slippage mode for the braking power transmission to apply braking power without assistance from the at least one MR fluid clutch apparatus.

Still further in accordance with the first embodiment, the processing unit detects a deceleration beyond a predetermined threshold from the information indicative of the braking state, and outputs the signal for the at least one MR fluid clutch apparatus to reduce a braking power transmitted to brake devices of the brake system.

Still further in accordance with the first embodiment, the processing unit detects a potential locking of a wheel from the information indicative of the braking state, and outputs the signal for the at least one MR fluid clutch apparatus to reduce a braking power transmitted to brake devices of the brake to prevent wheel locking.

Still further in accordance with the first embodiment, the at least one MR fluid clutch apparatus is coupled to the braking power transmission by the modulation interface such that the at least one MR fluid clutch apparatus transmits torque to add braking power transmitted to brake devices of the brake system.

Still further in accordance with the first embodiment, the processing unit detects an acceleration beyond a predetermined threshold from the information indicative of the braking state, and outputs the signal for the at least one MR fluid clutch apparatus to add a braking power to brake devices of the brake system.

Still further in accordance with the first embodiment, the processing unit detects an excessive spinning of a wheel from the information indicative of the braking state, and outputs the signal for the at least one MR fluid clutch apparatus to add the braking power to brake devices of the brake system.

Still further in accordance with the first embodiment, a brake system comprises at least one brake device configured to brake a wheel of a vehicle; at least one brake input interface adapted to be manually actuated; a braking power transmission transmitting braking power from the at least one brake input interface to the at least one brake device; the braking control apparatus as described above.

Still further in accordance with the first embodiment, the at least one brake input interface is a hand-brake lever.

Still further in accordance with the first embodiment, the at least one brake device is a caliper.

Still further in accordance with the first embodiment, the brake device is configured to brake a disc, and further wherein the at least one sensor monitors a rotation of the disc.

In accordance with a second embodiment of the present disclosure, there is provided a method for assisting a manually-actuated braking of a vehicle, comprising monitoring a braking state of a vehicle during a manually-actuated braking action on a braking power transmission of a brake system; detecting from the braking state that a desired force is required; controlling at least one MR fluid clutch apparatus to transmit torque to the braking power transmission of the brake system to assist the manually-actuated braking of the vehicle.

Further in accordance with the second embodiment, monitoring the braking state comprises monitoring a speed related to a wheel of the vehicle.

Still further in accordance with the second embodiment, detecting from the braking state that a desired force is required comprises detecting a deceleration beyond a predetermined threshold.

Still further in accordance with the second embodiment, detecting from the braking state that a desired force is required comprises detecting a potential locking of the wheel.

Still further in accordance with the second embodiment, controlling at least one MR fluid clutch apparatus to transmit torque to the braking power transmission of the brake system comprises controlling the at least one MR fluid clutch apparatus to reduce a braking power transmitted to at least one brake device of the brake system.

Still further in accordance with the second embodiment, controlling at least one MR fluid clutch apparatus to transmit torque to the braking power transmission of the brake system comprises controlling the at least one MR fluid clutch apparatus to prevent locking of at least one wheel of the vehicle.

Still further in accordance with the second embodiment, detecting from the braking state that a desired force is required comprises detecting acceleration beyond a predetermined threshold.

Still further in accordance with the second embodiment, detecting from the braking state that a desired force is required comprises detecting an excessive spinning of the wheel.

Still further in accordance with the second embodiment, controlling at least one MR fluid clutch apparatus to transmit torque to the braking power transmission of the brake system comprises controlling the at least one MR fluid clutch apparatus to prevent spinning of at least one wheel of the vehicle.

DETAILED DESCRIPTION

Figure 1A:
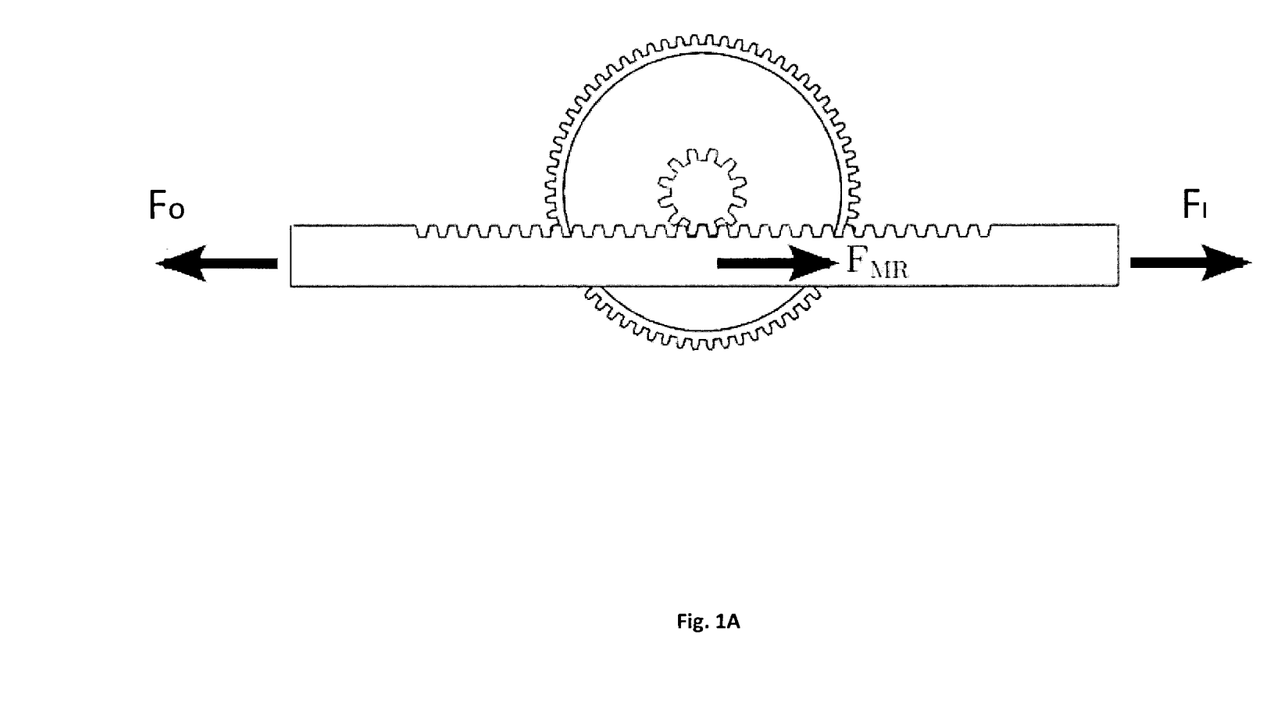
FIG. 1A is a schematic view of a concept of MR fluid force modulation to manual actuation in accordance with the present disclosure, in a single degree of modulation.

Referring to FIG. 1A, there is illustrated a general embodiment of the present disclosure. In the context of a user-applied force $F_I$ to produce an output force $F_O$, a magnetorheological (MR) fluid clutch apparatus may be used to provide some modulation to the user-applied force $F_I$ by transmitting a force $F_{MR}$ from a power source, in order to boost or lessen the output force $F_O$ relative to the input force, i.e., a single degree of assistance. As opposed to standard actuated systems, in manually-actuated systems that employ MR fluid modulation, the primary force $F_I$ is provided by the human muscles while a MR fluid based actuator is used to modulate the primary force. In doing so, the force transmission may benefit from the characteristics of MR fluid clutching such as a high capacity to reduce or increase the force or pressure from the input to the output, a low output inertia for high dynamic response, a high bandwidth for high dynamic response. MR actuator technology operates at a bandwidth that is higher than human body muscles and with better force-to-weight ratio, whereby it is desirable to combine MR actuator technology with cable, hydraulic, pneumatic transmission of manual actuation. The general embodiment may be used in various applications, such as brake systems.

Figure 1B:
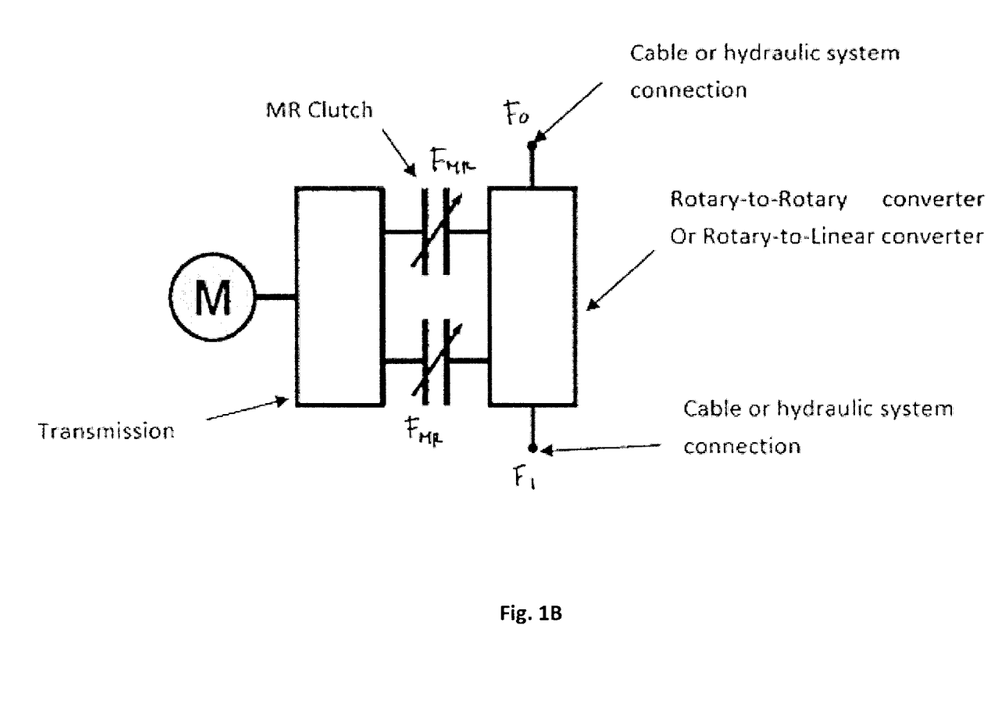
FIG. 1B is a schematic view of the concept of MR fluid force modulation to manual actuation in accordance with the present disclosure, with two degrees of modulation.

Referring to FIG. 1B, an embodiment of the present disclosure is shown using a pair of MR fluid clutch apparatuses producing forces $F_{MR}$, for example in opposite directions, to transmit actuation from the motor M, to user-applied force $F_I$ and to output force $F_O$. A rotary-to-rotary converter or a rotary-to-linear converter may be used to interface the MR fluid clutch apparatuses to the user-applied force $F_I$ and to output force $F_O$.

Figure 2:
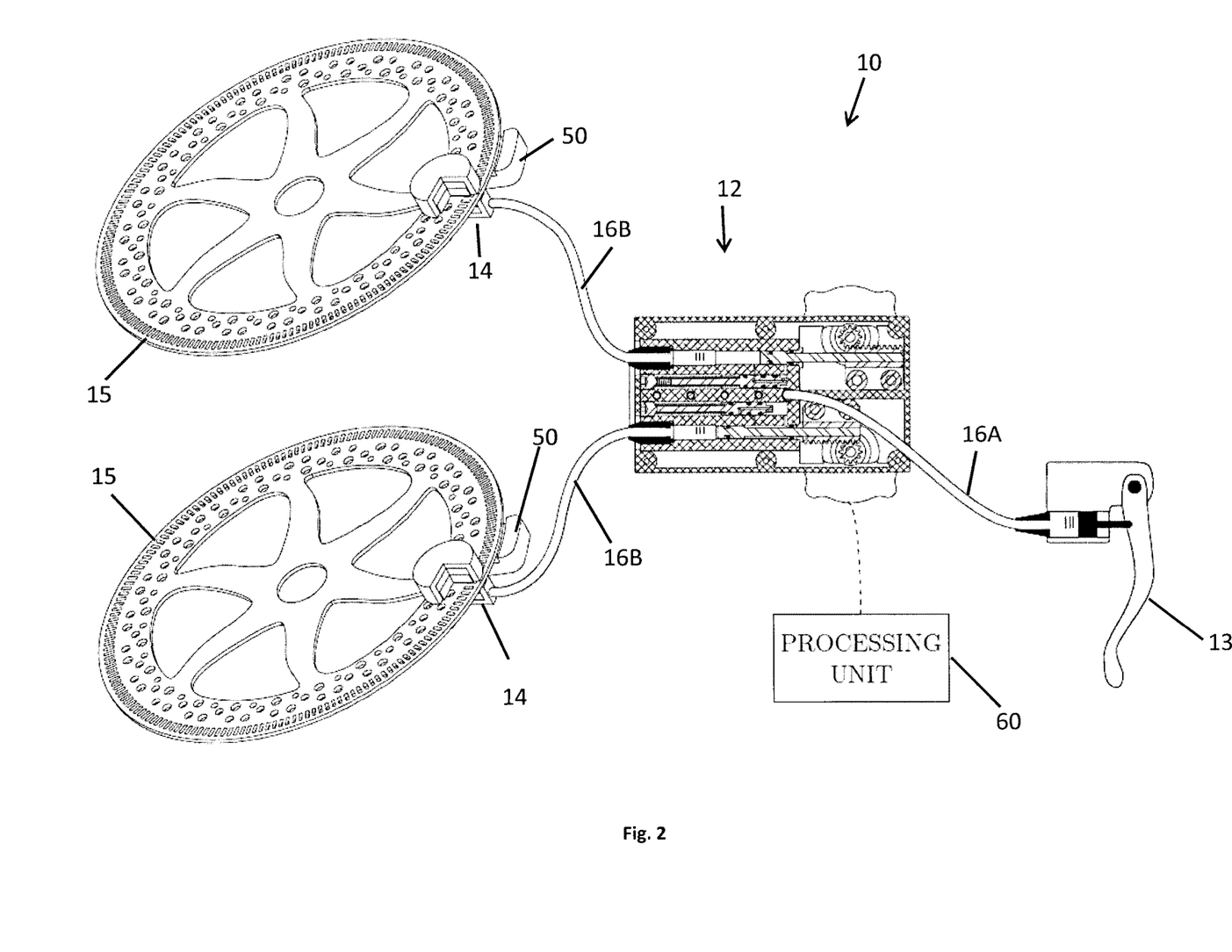
FIG. 2 is a schematic view of a brake system using MR fluid modulation in accordance with the present disclosure, with single lever.
Figure 3:
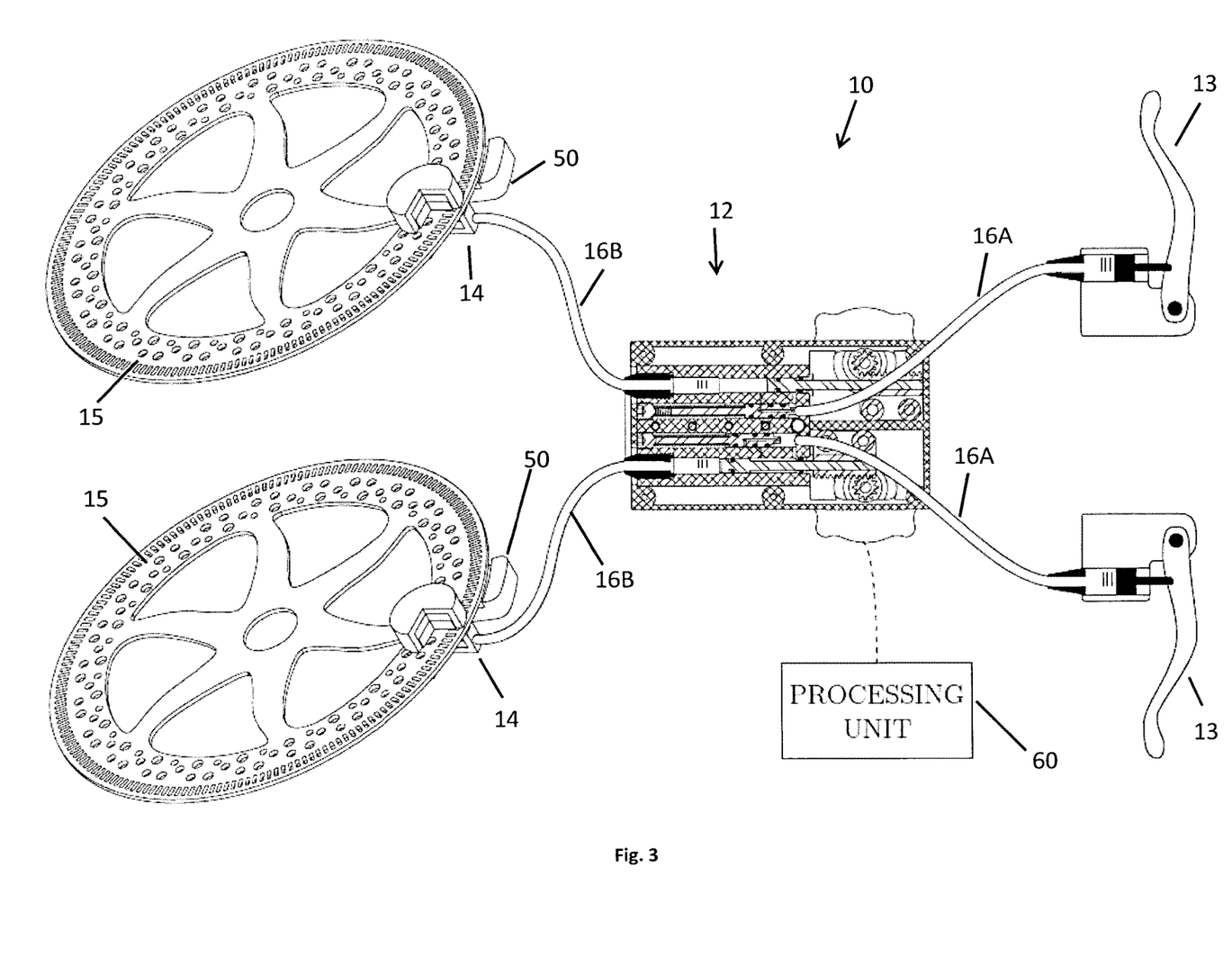
FIG. 3 is a schematic view of a brake system using MR fluid modulation in accordance with the present disclosure, with dual levers.

Referring to the drawings and more particularly to FIGS. 2 and 3, there is illustrated a brake system 10 using braking modulation from a braking controller apparatus 12 in accordance with the present disclosure, operated by one or more MR fluid clutch apparatuses. The braking modulation enabled by the braking controller apparatus 12 may take various forms, such as anti-lock braking (ABS) and/or power braking, among other possibilities. For exemplary purposes, the brake system 10 will be described hereinafter for use as part of a hydraulic bicycle brake system, but the braking controller apparatus 12 may be part of brake systems for other vehicles, such as cars, motorbikes (including motorcycles, scooters, three-wheeled vehicles or motorcycles, ATVs, etc), strollers, etc, to name a few of numerous possible braking applications. Moreover, although the brake system 10 is shown as hydraulic, systems of other nature can also benefit from the action of the braking controller apparatus 12, such as mechanical (e.g., cable), electromechanical, electronic, pneumatic and combinations thereof.

The brake system 10 may have a single lever configuration as in FIG. 2, or a dual lever configuration as in FIG. 3 as is currently standard for bicycles featuring front and rear-brake capability, with the levers shown as 13. The levers 13 are of the type that are hand actuated. However, it is considered to use the brake system 10 with other brake input interfaces, such as a brake pedal, dependent on the application. It is also considered to have a pressure-pump assisted system like found in various cars, the pressure pump having an influence on the input force that could be modulated by an MR fluid clutch apparatus. In the illustrated embodiment, calipers 14 are at the output end of the brake system 10, and apply braking force on discs 15 mounted to a wheel. Again, other configurations are considered for the brake system 10, for instance with rim calipers such as cantilever, V-brake, single- or dual-pivot cantilever, drum, to name but a few of the brake devices that may be used.

Hydraulic conduits, concurrently referred to as 16, are used to activate the calipers 14, the hydraulic conduits relating the levers 13 to the braking controller apparatus 12 shown as 16A, and the hydraulic conduits relating the braking controller apparatus 12 to the calipers 14 shown as 16B. In standard fashion, a user manually applies a pressure on the lever(s) 13 and this pressure results in the calipers 14 applying a braking force on the discs 15, as transmitted by the oil in the conduits 16. The conduits 16 are present due to the illustrated nature of the brake system 10. Other transmission means include wires or cables in housings, electric cables, pneumatic conduits, etc. If the brake system is cable-actuated, the braking controller apparatus 12 will be strictly mechanical, no hydraulic oil being present.

Figure 4:
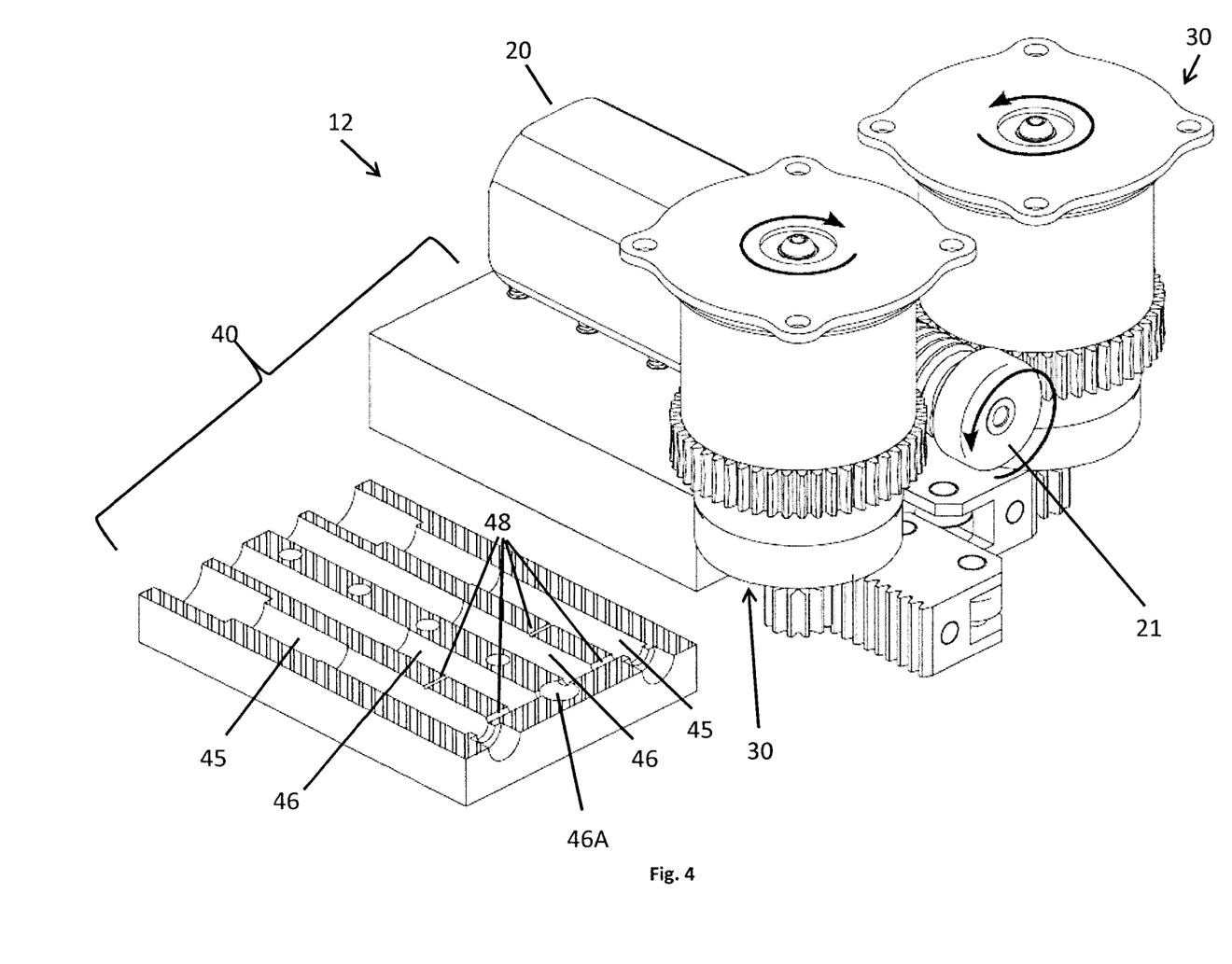
FIG. 4 is a perspective assembly view of a braking controller unit with MR fluid clutch apparatuses of the brake system of FIGS. 2 and 3.

Referring to FIG. 4, the braking controller apparatus 12 is shown in greater detail. The braking controller apparatus 12 has a motor 20, a pair of MR fluid clutch apparatuses 30, a modulation interface 40, sensors 50 (FIG. 2), and a processor unit 60:

The motor 20 supplies the mechanical power to the braking controller apparatus 12;

The MR fluid clutch apparatuses 30 control the modulation force to perform desired braking modulation;

The modulation interface 40 interfaces the MR fluid clutch apparatuses 30 to the transmission means, i.e., the hydraulic circuit in the illustrated embodiment;

The sensors 50 determine information indicative of the braking or acceleration state of the vehicle, such as the speed of the discs 15 or wheel supporting the discs 15, the braking or acceleration torque generated on the wheel. In some cases, there may be benefits for sensor to also monitor vehicle on environment conditions (i.e. inclination, temperature, humidity only to name a few), and may take various forms such as encoders, accelerometers and/or inclinometers; and The processing unit 60 actuates the various components listed above based on a desired braking or acceleration operation scheme.

The motor 20 may be any appropriate type of motor. In an embodiment, a battery-operated low voltage DC motor is used. The DC motor 20 may be powered by the processing unit 60, by being connected to an electrical system of the vehicle, or by having its own battery, among possibilities. A worm or endless screw 21 is provided on an output shaft of the motor 20.

Figure 5A:
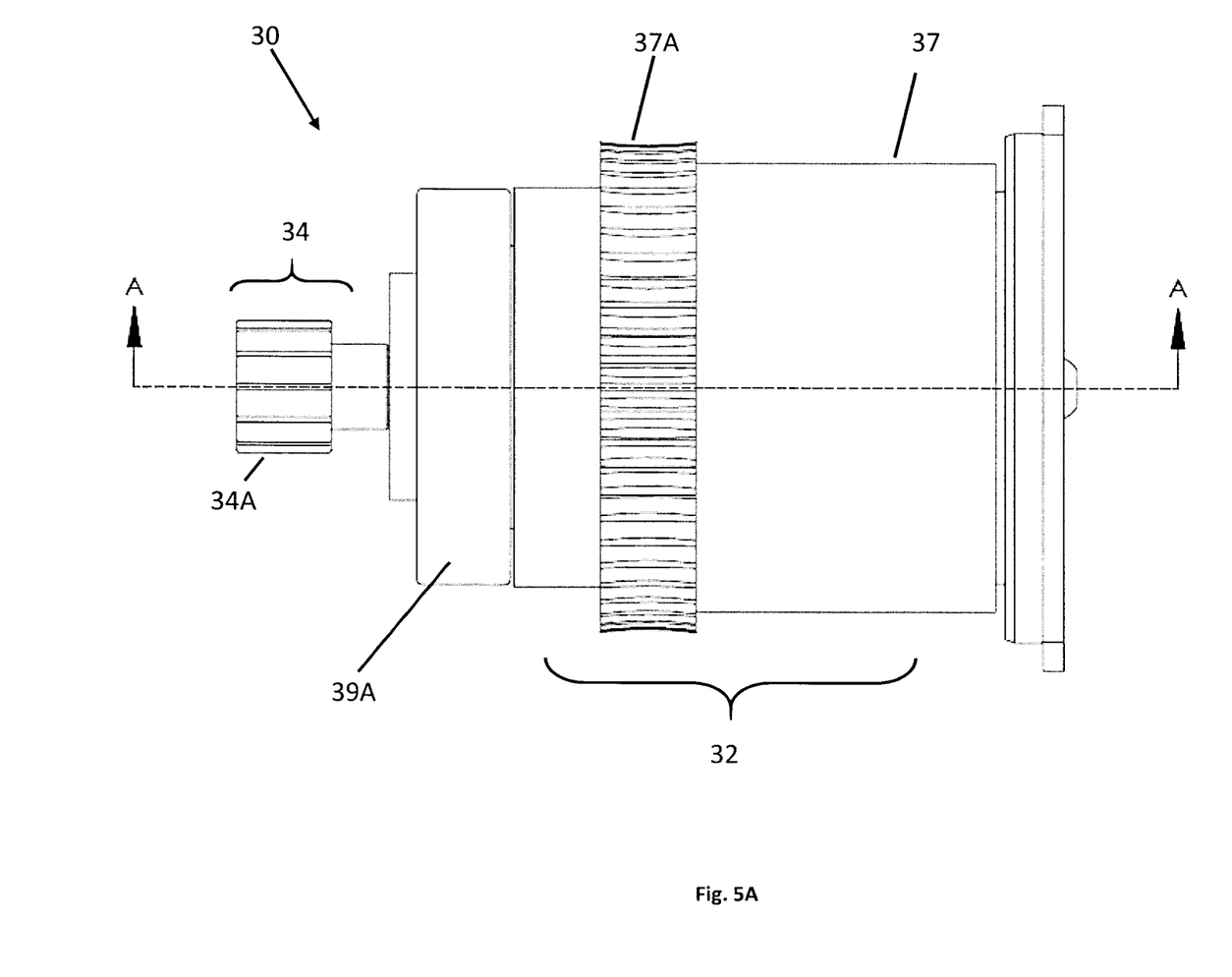
FIG. 5A is an elevation view of one of the MR fluid clutch apparatuses of the braking controller unit of FIG. 4.
Figure 5B:
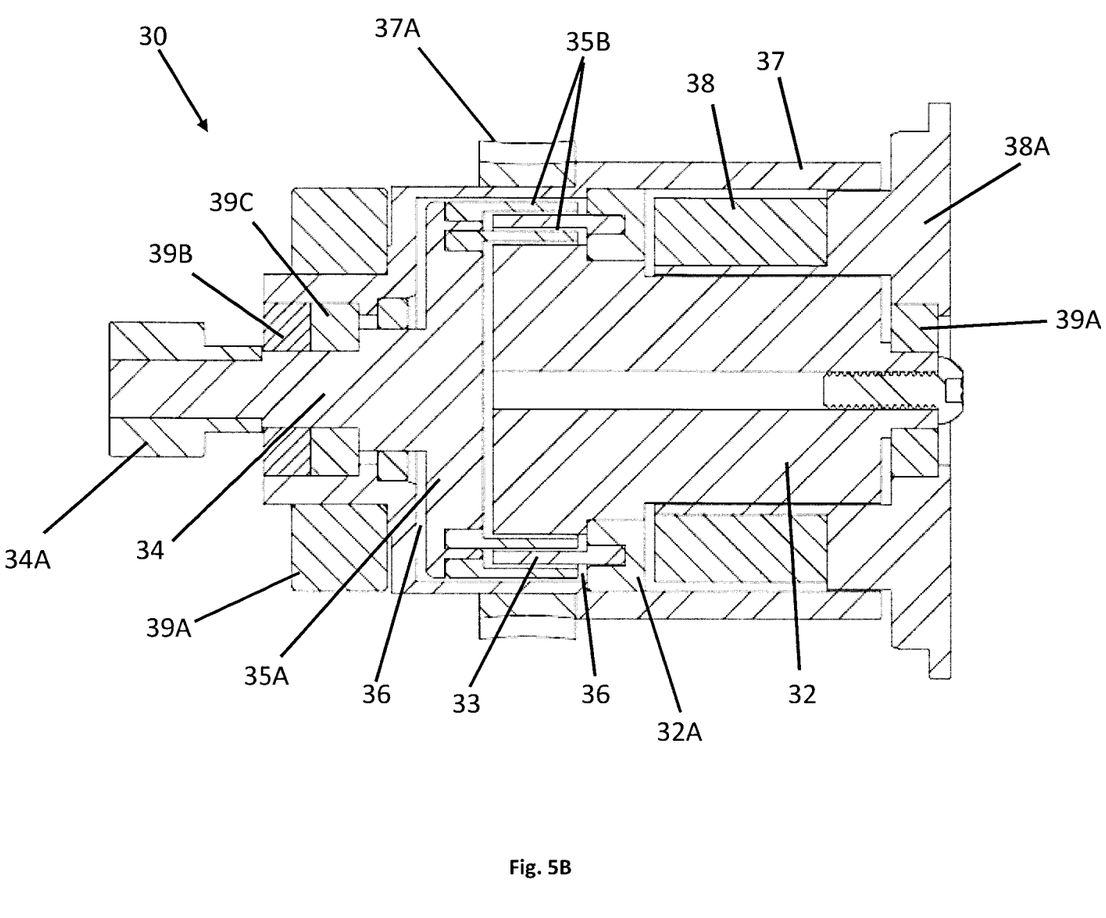
FIG. 5B is a cross-sectional view of one of the MR fluid clutch apparatuses of the braking controller unit of FIG. 4.

Referring to FIGS. 5A and 5B, one of the MR fluid clutch apparatuses 30 is shown in greater detail. The MR fluid clutch apparatus 30 has a driving member 32 with a disk 32A from which project a drum or drums 33 in an axial direction, this assembly also known as input rotor. The MR fluid clutch apparatus 30 also has a driven member 34 with a disk 35A from which project drums 35B intertwined with the drums 33 to define an annular chamber(s) filled with an MR fluid 36. The assembly of the driven member 34 and drums 35B is also known as the output rotor, and may also feature an output gear 34A. The annular chamber is delimited by a casing 37 that is integrally connected to the driving member 32, and thus some surfaces of the casing 37 opposite the drums 35B are known as shear surfaces as they will collaborate with the drums 35B during torque transmission, as described below. Worm gear 37A is formed on the outer surface of the casing 37 and is operatively meshed to the worm 21 of the motor 20 to receive the rotational input from the motor 20, as illustrated in FIG. 4.

In the example of FIGS. 5A and 5B, the driving member 32 is therefore in mechanical communication with the power input, i.e., the motor 20, and the driven member 34 may be in mechanical communication with a power output (i.e., force output, torque output) in the modulation interface 40, as detailed hereinafter. MR fluid 36 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the drum(s) 33 and of the shear surfaces of the casing 37 on the driving side, and that of the drum(s) 35B in the annular chamber. The magnetic field intensity mainly affects the yield shear stress of the MR fluid. The yield shear stress of the fluid when in its active ("on") state may be controlled by varying the magnetic field intensity produced by electromagnet 38 integrated in a fixed part 38A, i.e., the input current, via the control of the processing unit 60. Accordingly, the MR fluid's ability to transmit force can be controlled with the electromagnet 38, thereby acting as a clutch between the members 32 and 34. The electromagnet 38 is configured to vary the strength of the magnetic field such that the friction between the members 32 and 34 is low enough to allow the driving member 12 to freely rotate with the driven member 34 and vice versa, i.e., in controlled slippage. In the illustrated embodiment, the electromagnet 38 is separated from the rotatable portions with a fluid gap, the electromagnet 38 being mounted on the fixed part 38A. In another configuration, the electromagnet could be mounted to the casing 37 with slip ring or wireless power communication. Various configurations are possible for the MR fluid clutch apparatuses 30. For example, the MR fluid clutch apparatuses 10 may have intertwined discs instead of the intertwined drums, as a possible configuration.

The driving member 32 is driven at a desired speed by the motor 20 as controlled by the gear reduction of the worm 21 and worm gear 37A, and the output rotor is connected to a mechanical device to be controlled. Other mechanical arrangements are considered, to reduce the output speed of the motor 20 if necessary (direct drive, belts and pulleys, etc). The torque transmitted by the MR fluid clutch apparatus 30 is related to the intensity of the magnetic field passing through the MR fluid. The magnetic field intensity is modulated by the coil of the electromagnet 38.

Bearings 39A and 39B may interface the driving member 32 to the driven member 34, and the MR fluid clutch apparatus 30 to an outer body of the modulation interface 40, to enable the rotations described above. Any appropriate sealing arrangement may be used, such as a seal 39C.

Figure 6:
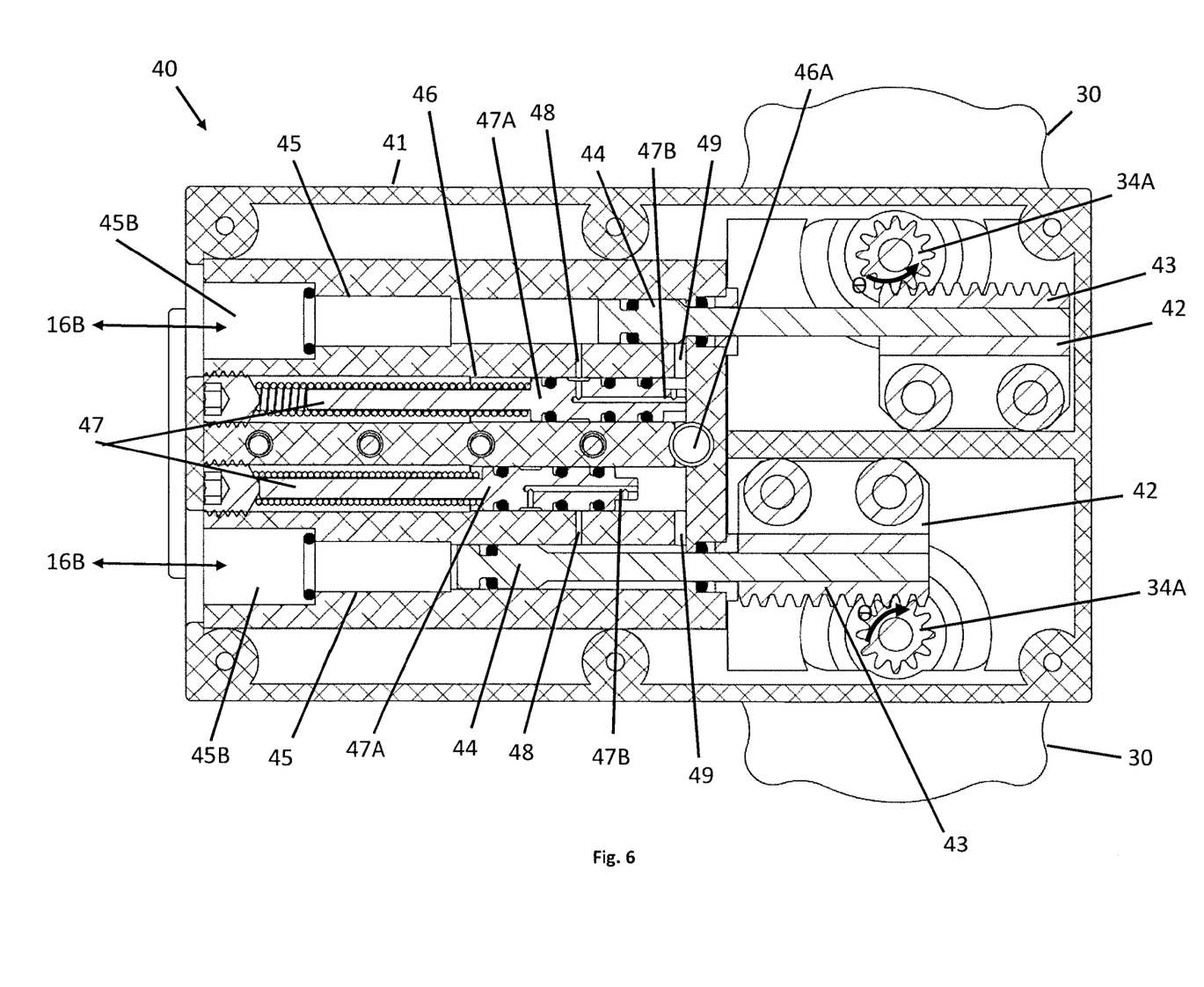
FIG. 6 is a cross-sectional view of a modulation interface of the braking controller unit of FIG. 4.

Referring now to FIG. 6, the modulation interface 40 is shown in greater detail. The modulation interface 40 is described hereinafter as having some hydraulic components. It should however be understood that mechanical, electrical, electromechanical and/or pneumatic could be used as well according to the nature of brake system 10. The modulation interface 40 has a casing 41 in which project the output gears 34A of the MR fluid clutch apparatuses 30. The output gears 34A are meshed with respective carriages 42 configured to translate within the casing 41, by the cooperative action of the output gears 34A (i.e., pinions) and racks 43. In ABS-type assistance, the output gears 34A are designed to be driven in direction ⊖. In traction control type of assistance, gear 34A would be driven in the opposite direction.

Control pistons 44 are integrally connected to the carriages 42, such that a translation of the carriages 42 results in a concurrent translation of the control pistons 44. The control pistons 44 are respectively received in barrels 45, with which they form hydraulic cylinders. The conduits 16B are connected to the ends 45B of these hydraulic cylinders in such a way that these hydraulic cylinders are part of the hydraulic circuits. As the control pistons 44 act on the oil of the hydraulic circuit, it is by way of the control pistons 44 that the braking controller apparatus 12 may vary the output pressure and therefore modulate the braking action.

The barrels 45 may be machined in a monolithic block or monolithic block halves, along with barrels 46. Ends of the barrels 46 are connected to the conduit(s) 16A and are hence exposed to the actuating pressure that is manually applied via the lever(s) 13 (FIGS. 2 and 3). In FIG. 6, a single-lever configuration is shown that corresponds to that of FIG. 2, whereby a shared inlet 46A is connected to the conduit 16A and directs the oil into both of the barrels 46. In other words, a common input hydraulic conduit 16A is shared, for a single actuation (common input braking force) to drive multiple braking outputs. However, the conduits 16A may each be connected to a respective barrel 46, for the dual-lever brake configuration shown in FIG. 3.

The barrels 46 each enclose spring-loaded bleed valves 47, which valves are one type of valve among numerous valve types that are contemplated. The spring-loaded bleed valves 47 may optionally be present, to allow a bleed of air that may be in the hydraulic conduits. The bleed valves 47 may be specific to brake systems of hydraulic nature. The bleed valves 47 each have a piston 47A with an inner conduit 47B. The bleed valves 47 may be displaced between a normal bypass position, shown in the upper bleed valve 47 of FIG. 6 as a result of the biasing action of the spring, and a retracted position shown in the lower bleed valve 47 in FIG. 6 when pressure is applied by the lever(s) 13 (FIGS. 2 and 3).

In the normal bypass position, the inner conduit 47B is aligned with conduits 48 extending between pairs of the barrels 45 and 46. This ensures that the conduits 16 are filled with oil, with oil passing through the conduits 48. When a user applies a manual force via the lever(s) 13 (FIGS. 2 and 3), the oil pressure in the conduit(s) 16A will eventually force the piston 47A from the normal bypass position to the retracted position, thereby closing the bypass portion of the circuit by offsetting the inner conduit 47B from the conduits 48. This is achieved by the clearance between the right-hand side of the piston 47A (FIG. 6) and the barrel 46, in which the oil pressure builds to displace the piston 47A toward the left. At that moment, when the piston 47A is in the retracted position, the control pistons 44 are displaced to vary the brake force applied on the calipers 14 (FIGS. 2 and 3), until the brakes are released. This is achieved by oil moving via passage 49 to the clearance between the right-hand side of the piston 44 (FIG. 6) and the barrel 45, in which the oil pressure builds to displace the piston 44 toward the left. Again, the use of the bleed valves 47 is optional, as the conduit 16A may instead apply pressure directly on the piston 44.

Now that the various components of the brake system 10 have been described, an operation thereof in an ABS mode is set forth for a two-wheel vehicle such as a bicycle with front and rear brakes, as in FIGS. 2 and 3, as a non-limitative example.

It is firstly assumed that the brake system 10 is correctly filled with oil, in such a way that the application of a force on the lever 13 will result in a braking action applied on the discs 15 by the calipers 14, if the brake modulation apparatus 12 is functional. When the user decides to brake, a force is applied on the lever(s) 13. The oil pressure will be transmitted via conduit 16A, through the bleed valves 47 (in the normal bypass position) and conduits 48, through the barrel 45, to the conduits 16B. As a result, the calipers 14 will start pressing against the discs 15. As the brake force $F_O$ is applied by the calipers 14 to brake the wheels, a pressure build up will cause the bleed valves 47 to move to the retracted position. The pressure build up will also cause the movement of the pistons 44 toward the left-hand side in FIG. 6, such that force $F_O$ is controlled by the pistons 44. At this point, the brake modulation apparatus 12 may come into action by applying force $F_{MR}$. In the case of ABS mode, the brake modulation apparatus 12 will activate the MR fluid clutch apparatuses 10 to lessen $F_O$ by moving the control pistons 44 toward the right-hand side in FIG. 6, and later to release the MR fluid clutch apparatuses 30 to re-establish $F_O$, creating a reciprocating action common to ABS braking. $F_O$ is re-established as a balancing of forces $F_I$ and $F_O$.

The processing unit 60 may oversee this operation by simply calculating the speed of rotation of the discs 15 (integrally connected to the wheels) using the sensors 50 (FIGS. 2 and 3). For example, a given speed differential between front wheel and rear wheel may indicate an instance of wheel locking, necessitating ABS compensation. The processing unit 60 may vary its input current for each MR fluid clutch apparatus 30 to customize the ABS effect on each wheel. As another example, an acceleration beyond a given threshold may be an indication of a lack of traction and/or excessive wheel spinning. Again, the processing unit 60 may vary its input current for each MR fluid clutch apparatus 30 to customize the ABS effect on each wheel.

The proposed brake system 10 may enable any combination of these features: it modulates finely the pressure on the brake pad to prevent wheel locking and/or wheel spinning, it offers an enhanced performance over traditional hydraulic valve systems, it enables the use of a single brake master cylinder with multipoint control pressure, and a single brake lever on a bicycle acting on 2 master cylinders as shown in FIG. 2. In an embodiment, ABS mode can be on one (single MR fluid clutch apparatus required) or both brakes. In yet another embodiment, the force is balanced dynamically from front to rear in order to achieve safer and more optimal braking. In some cases, more pressure needs to be applied to the front brake while in other cases, more pressure should be applied to rear brake, and the brake modulation apparatus 12 enables this. The system, with the help of rotation sensors 50 at the wheel may automatically perform the balancing. Other types of sensors may be used.

Figure 7:
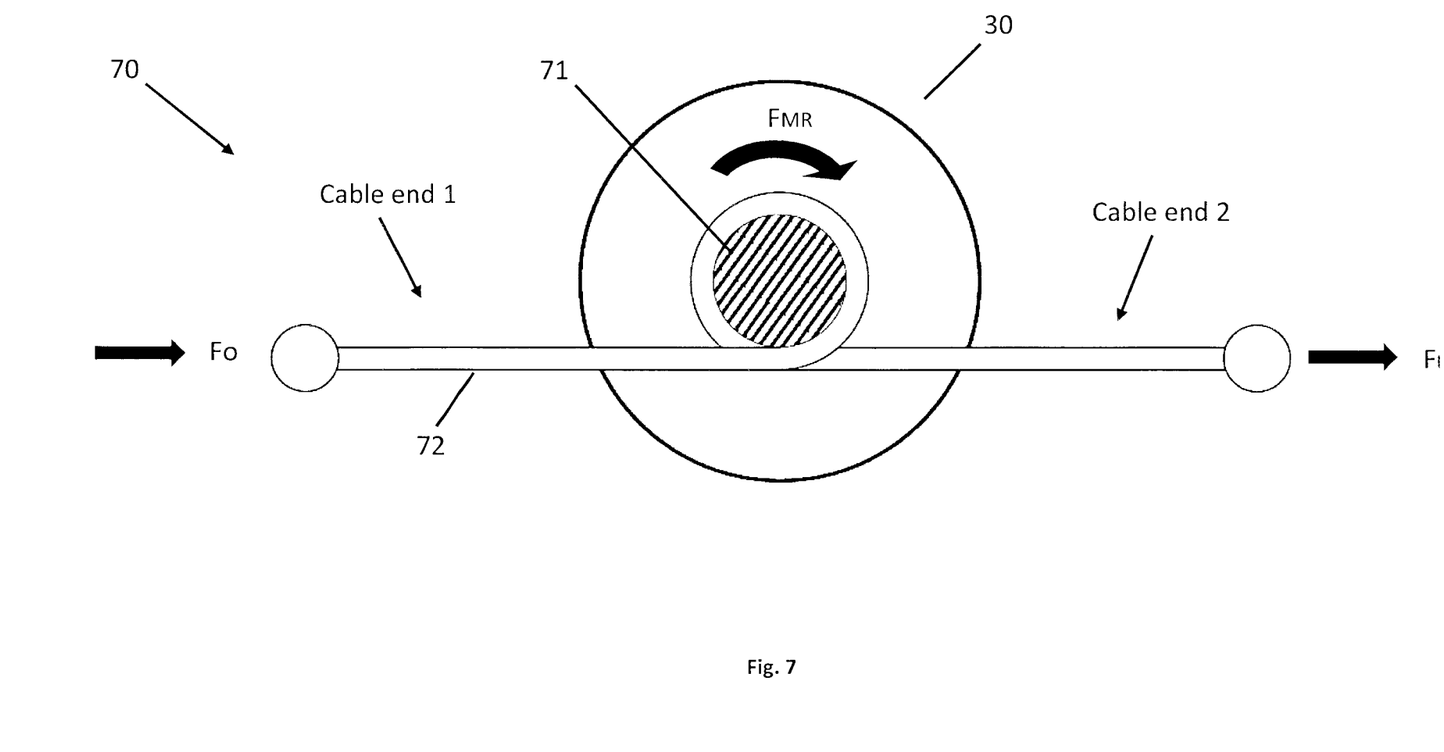
FIG. 7 is a schematic view of a manually-actuated system using MR fluid modulation via a capstan.
Figure 8:
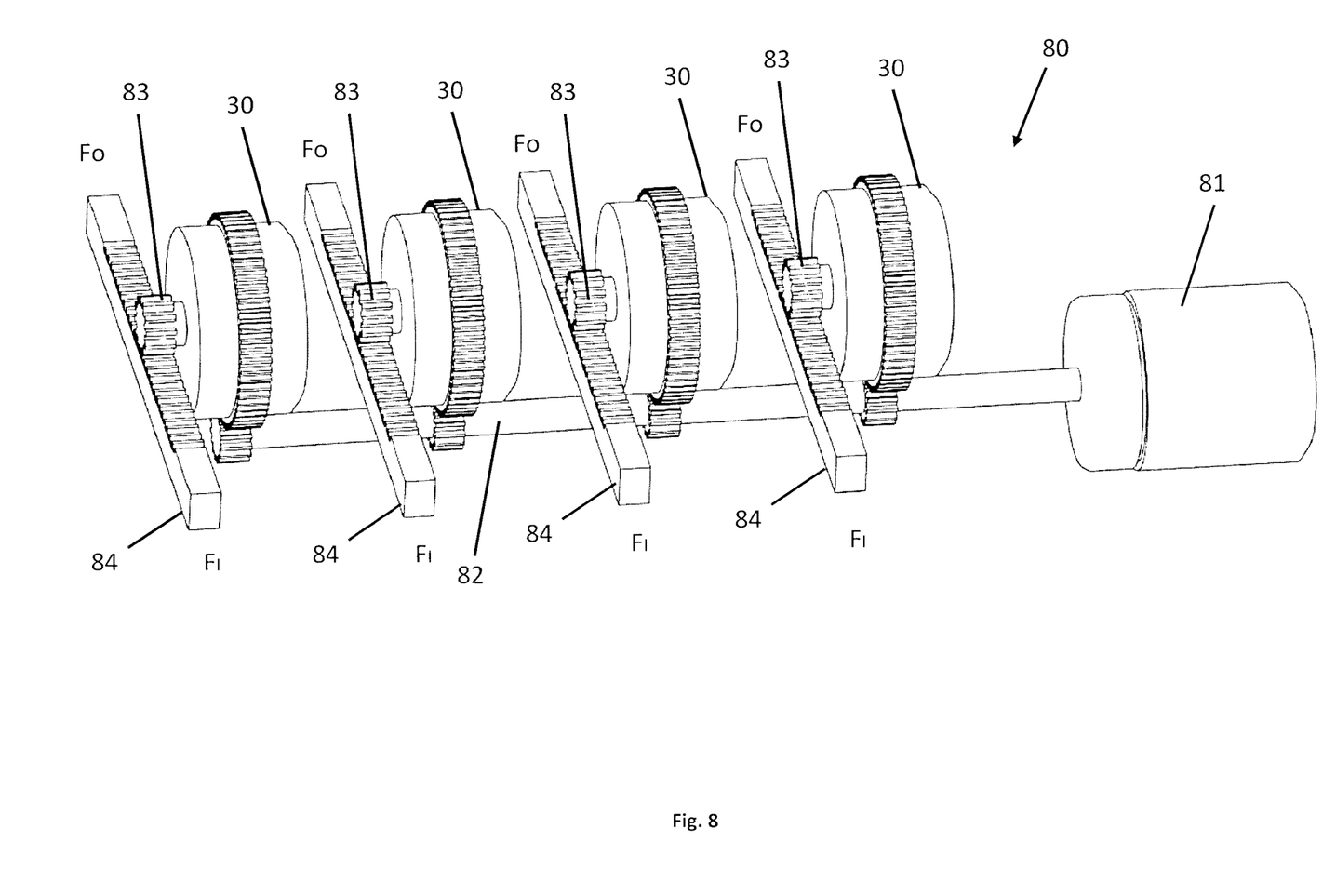
FIG. 8 is a perspective view of a manually-actuated system using MR fluid modulation for multiple input/outputs.

FIG. 7 and FIG. 8 show two contemplated mechanical arrangements to convert the rotary force of the MR actuator into linear force that can modulate the input or the output of a manually-operated brake system. These mechanical arrangements are provided as non-exhaustive examples, as other arrangements are considered as well. In either of these mechanical arrangements, the output $F_O$ and/or the input $F_I$ may be connected to a linkage, a cable or a hydraulic system.

Referring to FIG. 7, there is shown an embodiment for a rotary-to-linear converter 70 of a manually-actuated system that may be used in a cable brake system, to modulate the braking force. The system 70 has an MR fluid clutch apparatus 30 connected to a capstan 71 so as to selectively transmit force from a power source (e.g., motor) to the user, via cable 72 wound on the capstan 71 in a conventional fashion. Capstan 71 may also be replaced by a common pulley and cable 72 may be replaced by 2 cables, both cables being attached to the common pulley 71. User-applied force $F_I$, for example a pulling action from a brake lever, produces an output force $F_O$ to displace a load. In doing so, the friction between the cable 72 and the capstan 71 is such that the capstan 71 rotates as the cable 72 moves axially. The magnetorheological fluid clutch apparatus 30 may selectively transmit a rotation force $F_{MR}$ to assist in displacing the load, via the capstan 71. For example, when the manually-actuated system 70 is used as part of a vehicle brake system, the speed of the vehicle wheel may be monitored, among other possible parameters to be measured, as a response to a user-applied force $F_I$. If a deceleration beyond a given level or predetermined threshold is detected, this may be interpreted as a braking force higher than what is required. The magnetorheological fluid clutch apparatus 30 may therefore be actuated in controlled slippage to provide its force $F_{MR}$ at a sufficient magnitude to decrease the effective braking force, and therefore optimize the braking. The force input from the magnetorheological fluid clutch apparatus 30 is such that there remains some tension at cable end 1 (force $F_O$) for the capstan 71 to remain operation in exerting a pull on the cable end 1. The above example is one among other examples in which MR fluid modulation may be integrated in a braking system, or for displacing loads. Moreover, as an alternative to the capstan 71, pulleys, racks and pinions, chain and sprockets, hydraulics, pneumatics, etc, could be used as well. Alternatively, if an acceleration beyond a given level or predetermined threshold is detected, this may be interpreted as wheel spinning/traction loss. A magnetorheological fluid clutch apparatus 30 could therefore be actuated in controlled slippage to provide its force $F_{MR}$ (in an orientation contrary to the one shown) at a sufficient magnitude to decrease the wheel speed.

Referring to FIG. 8, a manually-actuated system for multiple input/outputs is generally shown at 80. The manually-actuated system 80 uses one power source, motor 81, with a plurality of MR fluid clutch apparatuses 30 mounted to an output shaft 82 receiving the actuation from the motor 81. Each of the MR fluid clutch apparatuses 30 is shown having a pinion 83 meshed to a rack 84, with each rack 84 being part of a manually-actuated system, for example as described in FIG. 1A. FIG. 8 is illustrative of the shared modulation using a single power output to multiple manually operated systems, and may use other mechanism for the modulation of the MR fluid clutch apparatus 30, whether it be capstans, pulleys, racks and pinions, chain and sprockets, hydraulics, pneumatics, etc. This configuration would particularly fit devices where multiple degree of modulation is seeked for manually actuated systems like multiple wheels braking systems.

The above pertains to different embodiments featuring MR fluid clutch apparatuses 30 where main feature is to reduce a rotational force. However, it is contemplated to use the MR fluid clutch apparatus 30 to perform a modulation where an increase of rotational force is required, to stop movement of a load. The braking controller apparatus 12 may therefore control braking with the processing unit 60 by performing a method for assisting a manually-actuated braking of a vehicle. The method may be in the form of non-transient machine executable instructions and may comprise monitoring a braking state of a vehicle during a manually-actuated braking action on a braking power transmission of a brake system; detecting from the braking state that a desired force is required; controlling the MR fluid clutch apparatus(es) 30 to transmit torque to the braking power transmission of the brake system 10 to assist the manually-actuated braking of the vehicle. Monitoring the braking state may comprise monitoring a speed related to a wheel of the vehicle. Detecting from the braking state that a desired force is required may comprise detecting a deceleration/acceleration beyond a predetermined threshold. Detecting from the braking state that a desired force is required may comprise detecting a potential locking of the wheel, or a loss of traction and/or excessive spinning. Controlling the MR fluid clutch apparatus(es) 30 to transmit torque to the braking power transmission of the brake system 10 may comprise controlling the MR fluid clutch apparatus(es) to reduce a braking power transmitted to brake device(s) 15 of the brake system 10, or add braking power to brake device(s) 15. Controlling the MR fluid clutch apparatus(es) 30 to transmit torque to the braking power transmission of the brake system 10 may comprise controlling the MR fluid clutch apparatus(es) 30 to prevent locking of the wheel of the vehicle, or add traction and/or reduce spinning.

While the brake system 10 has been described as receiving assistance from the braking control apparatus 12 to reduce the braking power, for instance in anti-lock manner, the braking control apparatus 12 may also be used to increase the braking power. For example, the braking control apparatus 12 may detect a user's intention to further decelerate by an increase $F_I$ pressure, but without a proportional deceleration from the wheel 15. This may be an occurrence when discs 15 are wet, by way of example. In such a scenario, the braking control apparatus 12 may increase the braking power by action of the MR fluid clutch apparatus(es) 30. Power braking is another contemplated application of the braking control apparatus 12.

What is claimed is:

1. A braking control apparatus comprising:
    at least one torque source;
    at least one magnetorheological (MR) fluid clutch apparatus having an input coupled to the at least one torque source to receive torque from the torque source, the MR fluid clutch apparatus controllable to transmit a variable amount of torque via an output thereof;
    a modulation interface coupling the output of the at least one MR fluid clutch apparatus to a braking power transmission of a brake system;
    at least one sensor for providing information indicative of a braking state of the load; and
    a processing unit for receiving the information indicative of the braking state of the load and for outputting a signal to control the at least one MR fluid clutch apparatus in exerting a desired force on the braking power transmission to assist in braking the load
    wherein the braking power transmission is a hydraulic conduit network, and wherein the modulation interface has a plurality of cylinders each with a piston coupled to the output of a respective one of the MR fluid clutch apparatus, each said cylinder configured to be coupled to a respective output hydraulic conduit of a respective brake device.

2. The braking control apparatus according to claim 1, wherein the output has a gear meshed to a rack connected to the piston to convert a rotation of the output to a translation of the piston.

3. The braking control apparatus according to claim 2, wherein the rack is mounted to a carriage in the modulation interface.

4. The braking control apparatus according to claim 1, further comprising a bleed valve associated to the cylinder, the bleed valve being biased to a bypass position in which the bleed valve defines a fluid passage for fluid in the braking power transmission to flow therethrough and transmit braking power, and a retracted position in which the bleed valve blocks said fluid passage for fluid in the braking power transmission to transmit braking power via the piston in the cylinder.

5. The braking control apparatus according to claim 1, wherein the plurality of the cylinders are connected to a single common input hydraulic conduit for receiving a common input braking force.

6. The braking control apparatus according to claim 1, wherein the plurality of the cylinders are each connected to respective input hydraulic conduit for receiving a respective input braking force.

7. The braking control apparatus according to claim 1, comprising a plurality of the MR fluid clutch apparatus each associated with a respective brake device, and further comprising a single one of the torque source, the input of each of the plurality of the MR fluid clutch apparatuses commonly connected to the single one of the torque sources.

8. The braking control apparatus according to claim 1, wherein the at least one MR fluid clutch apparatus is coupled to the braking power transmission by the modulation interface such that the at least one MR fluid clutch apparatus transmits torque to reduce a braking power transmitted to brake devices of the brake system.

9. The braking control apparatus according to claim 1, wherein the processing unit maintains the at least one MR fluid clutch apparatus in a slippage mode for the braking power transmission to apply braking power without assistance from the at least one MR fluid clutch apparatus.

10. The braking control apparatus according to claim 1, wherein the processing unit detects a deceleration beyond a predetermined threshold from the information indicative of the braking state, and outputs the signal for the at least one MR fluid clutch apparatus to reduce a braking power transmitted to brake devices of the brake system.

11. The braking control apparatus according to claim 1, wherein the processing unit detects a potential locking of a wheel from the information indicative of the braking state, and outputs the signal for the at least one MR fluid clutch apparatus to reduce a braking power transmitted to brake devices of the brake to prevent wheel locking.

12. The braking control apparatus according to claim 1, wherein the at least one MR fluid clutch apparatus is coupled to the braking power transmission by the modulation interface such that the at least one MR fluid clutch apparatus transmits torque to add braking power transmitted to brake devices of the brake system.

13. The braking control apparatus according to claim 12, wherein the processing unit detects an acceleration beyond a predetermined threshold from the information indicative of the braking state, and outputs the signal for the at least one MR fluid clutch apparatus to add a braking power to brake devices of the brake system.

14. The braking control apparatus according to claim 13, wherein the processing unit detects an excessive spinning of a wheel from the information indicative of the braking state, and outputs the signal for the at least one MR fluid clutch apparatus to add the braking power to brake devices of the brake system.

15. A braking control apparatus comprising:
    at least one torque source, the torque source being a motor;
    at least one magnetorheological (MR) fluid clutch apparatus having an input coupled to the at least one torque source to receive torque from the torque source, the MR fluid clutch apparatus controllable to transmit a variable amount of torque via an output thereof;
    a modulation interface coupling the output of the at least one MR fluid clutch apparatus to a braking power transmission of a brake system;
    at least one sensor for providing information indicative of a braking state of the load; and
    a processing unit for receiving the information indicative of the braking state of the load and for outputting a signal to control the at least one MR fluid clutch apparatus in exerting a desired force on the braking power transmission to assist in braking the load.

16. The braking control apparatus according to claim 15, wherein the output has a gear meshed to a rack, the rack being connected to the braking power transmission.

17. The braking control apparatus according to claim 15, wherein the output has ball screw meshed to a screw, the screw being connected mechanical transmission.

18. The braking control apparatus according to claim 15, comprising a plurality of the MR fluid clutch apparatus each associated with a respective brake device, and further comprising a single one of the torque source, the input of each of the plurality of the MR fluid clutch apparatuses commonly connected to the single one of the torque sources.

19. The braking control apparatus according to claim 15, wherein the at least one MR fluid clutch apparatus is coupled to the braking power transmission by the modulation interface such that the at least one MR fluid clutch apparatus transmits torque to reduce a braking power transmitted to brake devices of the brake system.

20. The braking control apparatus according to claim 15, wherein the processing unit maintains the at least one MR fluid clutch apparatus in a slippage mode for the braking power transmission to apply braking power without assistance from the at least one MR fluid clutch apparatus.

21. The braking control apparatus according to claim 15, wherein the processing unit detects a deceleration beyond a predetermined threshold from the information indicative of the braking state, and outputs the signal for the at least one MR fluid clutch apparatus to reduce a braking power transmitted to brake devices of the brake system.

22. The braking control apparatus according to claim 15, wherein the processing unit detects a potential locking of a wheel from the information indicative of the braking state, and outputs the signal for the at least one MR fluid clutch apparatus to reduce a braking power transmitted to brake devices of the brake to prevent wheel locking.

23. The braking control apparatus according to claim 15, wherein the at least one MR fluid clutch apparatus is coupled to the braking power transmission by the modulation interface such that the at least one MR fluid clutch apparatus transmits torque to add braking power transmitted to brake devices of the brake system.

24. The braking control apparatus according to claim 23, wherein the processing unit detects an acceleration beyond a predetermined threshold from the information indicative of the braking state, and outputs the signal for the at least one MR fluid clutch apparatus to add a braking power to brake devices of the brake system.

25. The braking control apparatus according to claim 24, wherein the processing unit detects an excessive spinning of a wheel from the information indicative of the braking state, and outputs the signal for the at least one MR fluid clutch apparatus to add the braking power to brake devices of the brake system.

26. A braking control apparatus comprising:
a single torque source;
a plurality of magnetorheological (MR) fluid clutch apparatuses, each of the MR fluid clutch apparatus having an input coupled to the single torque source to receive torque from the torque source, the MR fluid clutch apparatus controllable to transmit a variable amount of torque via an output thereof;
a modulation interface coupling the output of the MR fluid clutch apparatuses to a braking power transmission of a brake system;
at least one sensor for providing information indicative of a braking state of the load; and
a processing unit for receiving the information indicative of the braking state of the load and for outputting a signal to control the MR fluid clutch apparatuses in exerting a desired force on the braking power transmission to assist in braking the load;
when the MR fluid clutch apparatuses are each associated with a respective brake device, the input of each of the plurality of the MR fluid clutch apparatuses commonly connected to the single torque source.

27. The braking control apparatus according to claim 26, wherein the braking power transmission is a hydraulic conduit network, and wherein the modulation interface has at least one cylinder with a piston coupled to the output of the at least one MR fluid clutch apparatus.

28. The braking control apparatus according to claim 27, wherein the output has a gear meshed to a rack connected to the piston to convert a rotation of the output to a translation of the piston.

29. The braking control apparatus according to claim 28, wherein the rack is mounted to a carriage in the modulation interface.

30. The braking control apparatus according to claim 27, further comprising a bleed valve associated to the cylinder, the bleed valve being biased to a bypass position in which the bleed valve defines a fluid passage for fluid in the braking power transmission to flow therethrough and transmit braking power, and a retracted position in which the bleed valve blocks said fluid passage for fluid in the braking power transmission to transmit braking power via the piston in the cylinder.

31. The braking control apparatus according to claim 26, wherein the at least one MR fluid clutch apparatus is coupled to the braking power transmission by the modulation interface such that the at least one MR fluid clutch apparatus transmits torque to reduce a braking power transmitted to brake devices of the brake system.

32. The braking control apparatus according to claim 26, wherein the processing unit maintains the at least one MR fluid clutch apparatus in a slippage mode for the braking power transmission to apply braking power without assistance from the at least one MR fluid clutch apparatus.

33. The braking control apparatus according to claim 26, wherein the processing unit detects a deceleration beyond a predetermined threshold from the information indicative of the braking state, and outputs the signal for the at least one MR fluid clutch apparatus to reduce a braking power transmitted to brake devices of the brake system.

34. The braking control apparatus according to claim 26, wherein the processing unit detects a potential locking of a wheel from the information indicative of the braking state, and outputs the signal for the at least one MR fluid clutch apparatus to reduce a braking power transmitted to brake devices of the brake to prevent wheel locking.

35. The braking control apparatus according to claim 26, wherein the at least one MR fluid clutch apparatus is coupled to the braking power transmission by the modulation interface such that the at least one MR fluid clutch apparatus transmits torque to add braking power transmitted to brake devices of the brake system.

36. The braking control apparatus according to claim 35, wherein the processing unit detects an acceleration beyond a predetermined threshold from the information indicative of the braking state, and outputs the signal for the at least one MR fluid clutch apparatus to add a braking power to brake devices of the brake system.

37. The braking control apparatus according to claim 36, wherein the processing unit detects an excessive spinning of a wheel from the information indicative of the braking state, and outputs the signal for the at least one MR fluid clutch apparatus to add the braking power to brake devices of the brake system.

38. A braking control apparatus comprising:
at least one torque source;
at least one magnetorheological (MR) fluid clutch apparatus having an input coupled to the at least one torque source to receive torque from the torque source, the MR fluid clutch apparatus controllable to transmit a variable amount of torque via an output thereof;
a modulation interface coupling the output of the at least one MR fluid clutch apparatus to a braking power transmission of a brake system;
at least one sensor for providing information indicative of a braking state of the load; and
a processing unit for receiving the information indicative of the braking state of the load and for outputting a signal to control the at least one MR fluid clutch apparatus in exerting a desired force on the braking power transmission to assist in braking the load, the processing unit maintaining the at least one MR fluid clutch apparatus in a slippage mode for the braking power transmission to apply braking power without assistance from the at least one MR fluid clutch apparatus.

39. The braking control apparatus according to claim 38, wherein the braking power transmission is a hydraulic conduit network, and wherein the modulation interface has at least one cylinder with a piston coupled to the output of the at least one MR fluid clutch apparatus.

40. The braking control apparatus according to claim 39, wherein the output has a gear meshed to a rack connected to the piston to convert a rotation of the output to a translation of the piston.

41. The braking control apparatus according to claim 40, wherein the rack is mounted to a carriage in the modulation interface.

42. The braking control apparatus according to claim 39, further comprising a bleed valve associated to the cylinder, the bleed valve being biased to a bypass position in which the bleed valve defines a fluid passage for fluid in the braking power transmission to flow therethrough and transmit braking power, and a retracted position in which the bleed valve blocks said fluid passage for fluid in the braking power transmission to transmit braking power via the piston in the cylinder.

43. The braking control apparatus according to claim 38, wherein the at least one MR fluid clutch apparatus is coupled to the braking power transmission by the modulation interface such that the at least one MR fluid clutch apparatus transmits torque to reduce a braking power transmitted to brake devices of the brake system.

44. The braking control apparatus according to claim 38, wherein the processing unit detects a deceleration beyond a predetermined threshold from the information indicative of the braking state, and outputs the signal for the at least one MR fluid clutch apparatus to reduce a braking power transmitted to brake devices of the brake system.

45. The braking control apparatus according to claim 38, wherein the processing unit detects a potential locking of a wheel from the information indicative of the braking state, and outputs the signal for the at least one MR fluid clutch apparatus to reduce a braking power transmitted to brake devices of the brake to prevent wheel locking.

46. The braking control apparatus according to claim 38, wherein the at least one MR fluid clutch apparatus is coupled to the braking power transmission by the modulation interface such that the at least one MR fluid clutch apparatus transmits torque to add braking power transmitted to brake devices of the brake system.

47. The braking control apparatus according to claim 46, wherein the processing unit detects an acceleration beyond a predetermined threshold from the information indicative of the braking state, and outputs the signal for the at least one MR fluid clutch apparatus to add a braking power to brake devices of the brake system.

48. The braking control apparatus according to claim 47, wherein the processing unit detects an excessive spinning of a wheel from the information indicative of the braking state, and outputs the signal for the at least one MR fluid clutch apparatus to add the braking power to brake devices of the brake system.

* * * * *